(12) United States Patent
Baughman et al.

(10) Patent No.: US 12,488,028 B2
(45) Date of Patent: Dec. 2, 2025

(54) CLIPBOARD BASED SEARCH TERM PREDICTION

(71) Applicant: International Business Machines Corporation, Armonk, NY (US)

(72) Inventors: Aaron K. Baughman, Cary, NC (US); Shikhar Kwatra, San Jose, CA (US); Iranna Dharmaraya Ankad, Bengaluru (IN); Utpal Mangla, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 382 days.

(21) Appl. No.: 18/117,281

(22) Filed: Mar. 3, 2023

(65) Prior Publication Data

US 2024/0296176 A1    Sep. 5, 2024

(51) Int. Cl.
| | |
|---|---|
| *G06F 16/33* | (2025.01) |
| *G06F 9/54* | (2006.01) |
| *G06F 16/332* | (2019.01) |
| *G06F 40/205* | (2020.01) |
| *G06F 40/216* | (2020.01) |
| *G06F 40/274* | (2020.01) |

(Continued)

(52) U.S. Cl.
CPC ......... *G06F 16/3322* (2019.01); *G06F 9/543* (2013.01); *G06F 16/3323* (2019.01); *G06F 40/216* (2020.01); *G06F 40/274* (2020.01); *G06F 16/3329* (2019.01); *G06F 16/3349* (2019.01); *G06F 40/279* (2020.01); *G06F 40/289* (2020.01); *G06F 40/295* (2020.01)

(58) Field of Classification Search
None
See application file for complete search history.

(56) References Cited

U.S. PATENT DOCUMENTS

| | | | |
|---|---|---|---|
| 8,131,701 B2 | 3/2012 | Barney | |
| 8,631,009 B2 * | 1/2014 | Lisa | G06F 16/338 707/758 |

(Continued)

FOREIGN PATENT DOCUMENTS

| | | | | |
|---|---|---|---|---|
| CN | 112395109 A | * | 2/2021 | ........... G06F 40/242 |
| WO | 2019026087 A1 | | 2/2019 | |

OTHER PUBLICATIONS

IP.com translation of CN-112395109-A. (Year: 2021).*

(Continued)

*Primary Examiner* — Richard Z Zhu
(74) *Attorney, Agent, or Firm* — Garg Law Firm, PLLC; Rakesh Garg; Lily Neff

(57) ABSTRACT

Using a probability distribution and a search result history, a probability of selecting a specified number of relevant samples and a specified number of irrelevant samples from a set of contents is computed, each content in the set of contents comprising a content copied to a first system clipboard of a first device. Using the probability distribution, each content in the set of contents is weighted. Using the weighted set of contents, a set of predicted searches is generated. The set of predicted searches is presented for selection responsive to an indication of intent to perform a search. A selected search within the set of predicted searches is caused to be performed.

20 Claims, 6 Drawing Sheets

(51) Int. Cl.
  *G06F 16/3329*   (2025.01)
  *G06F 16/3349*   (2025.01)
  *G06F 40/279*   (2020.01)
  *G06F 40/289*   (2020.01)
  *G06F 40/295*   (2020.01)

(56) References Cited

U.S. PATENT DOCUMENTS

| | | | |
|---|---|---|---|
| 8,868,539 B2 | 10/2014 | Guha et al. | |
| 9,298,689 B2* | 3/2016 | Chang | G06F 9/543 |
| 10,185,762 B2 | 1/2019 | Hu et al. | |
| 10,262,057 B2 | 4/2019 | Vidra | |
| 10,621,237 B1 | 4/2020 | Rathnavelu et al. | |
| 11,263,248 B2 | 3/2022 | Vidra | |
| 11,321,153 B1* | 5/2022 | Kwatra | G06F 7/26 |
| 11,971,910 B2* | 4/2024 | Itoko | G06F 16/313 |
| 2002/0099685 A1* | 7/2002 | Takano | G06F 16/93 |
| 2008/0168059 A1* | 7/2008 | Hoashi | G06F 16/683 |
| 2014/0189572 A1* | 7/2014 | Martens | G06Q 30/0256 715/780 |
| 2017/0220680 A1* | 8/2017 | Shattuck | G06F 16/3326 |
| 2020/0125672 A1* | 4/2020 | Itoko | G06F 16/3329 |
| 2021/0089617 A1* | 3/2021 | Li | G06F 3/04883 |
| 2023/0047383 A1* | 2/2023 | Yushkina | G06F 16/9535 |
| 2023/0092702 A1* | 3/2023 | Mao | G06F 16/3329 704/9 |
| 2024/0143693 A1* | 5/2024 | Domitrz | G06F 17/16 |
| 2024/0330377 A1* | 10/2024 | Chembolu | G06N 3/08 |

OTHER PUBLICATIONS

Grames et al., An Automated Approach to Identifying Search Terms for Systematic Reviews Using Keyword Co-Occurrence Networks, Jul. 8, 2019.

Rahman, Search Engines Going Beyond Keyword Search: A Survey, International Journal of Computer Applications, vol. 75, No. 17, Aug. 2013.

ip.com, Method and Apparatus for Cognition-Enabled Predictive Web Search Suggestions, Oct. 29, 2021.

ip.com, A Method to Provide Context of the Information Viewed by Users to Enable Search Engines to Perform Context Based Searching, Dec. 17, 2019.

ip.com, System and Method for Automatic In-Context Search—Keyword Propagation, Oct. 19, 2012.

ip.com, System and Method to Enhance Search Relevance through Analyzing User's Searching Context, Aug. 3, 2011.

ip.com, Keyword Suggestion of Web Search Engine, Dec. 13, 2007.

Gurung et al., Intelligent Predictive String Search Algorithm, 7th International Conference on Communication, Computing and Virtualization 2016, Apr. 9, 2016.

* cited by examiner

CLIPBOARD BASED SEARCH TERM PREDICTION

BACKGROUND

The present invention relates generally to a method, system, and computer program product for search term prediction. More particularly, the present invention relates to a method, system, and computer program product for clipboard based search term prediction.

A system clipboard, or clipboard, is a buffer that some operating systems provide for short-term storage and transfer of data within and between application programs. A clipboard typically supports cut, copy and paste operations. Both cut and copy operations copy selected data to the clipboard; the cut operation also removes selected data from the data's original location. The paste operation inserts a portion of previously selected data, now stored in the clipboard, into a different location. Operating systems typically provide an application programming interface by which programs can specify cut, copy and paste operations. Individual programs, or the user interface of an operating system, typically include menu selections for the cut, copy and paste operations (typically in an Edit menu). Individual programs, or the user interface of an operating system, typically also support keyboard shortcuts, for example ctrl-c for the copy operation in the Windows operating system. (Windows is a registered trademark of Microsoft Corporation in the United States and other countries.)

Predictive search is a computer-implemented search approach that tries to anticipate a search a user intends to perform, using a predictive algorithm to generate and display a drop-down list of suggestions as soon as a user starts typing into a search box. The user can select one of the suggestions from the list instead of typing a complete query. Search predictions are typically generated based on one or more of the search terms a user types (e.g., by completing a word being typed or adding words or phrases that often follow a word being typed), past searches of the user (if the past searches have been recorded and associated with the user), and searches of other users (e.g., users in the same general location, or searches occurring close in time to each other).

SUMMARY

The illustrative embodiments provide a method, system, and computer program product. An embodiment includes a method that computes, using a probability distribution and a search result history, a probability of selecting a specified number of relevant samples and a specified number of irrelevant samples from a set of contents, each content in the set of contents comprising a content copied to a first system clipboard of a first device. An embodiment weights, using the probability distribution, each content in the set of contents, the weighting resulting in a weighted set of contents. An embodiment generates, using the weighted set of contents, a set of predicted searches. An embodiment presents, for selection responsive to an indication of intent to perform a search, the set of predicted searches. An embodiment causes performance of a selected search within the set of predicted searches.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
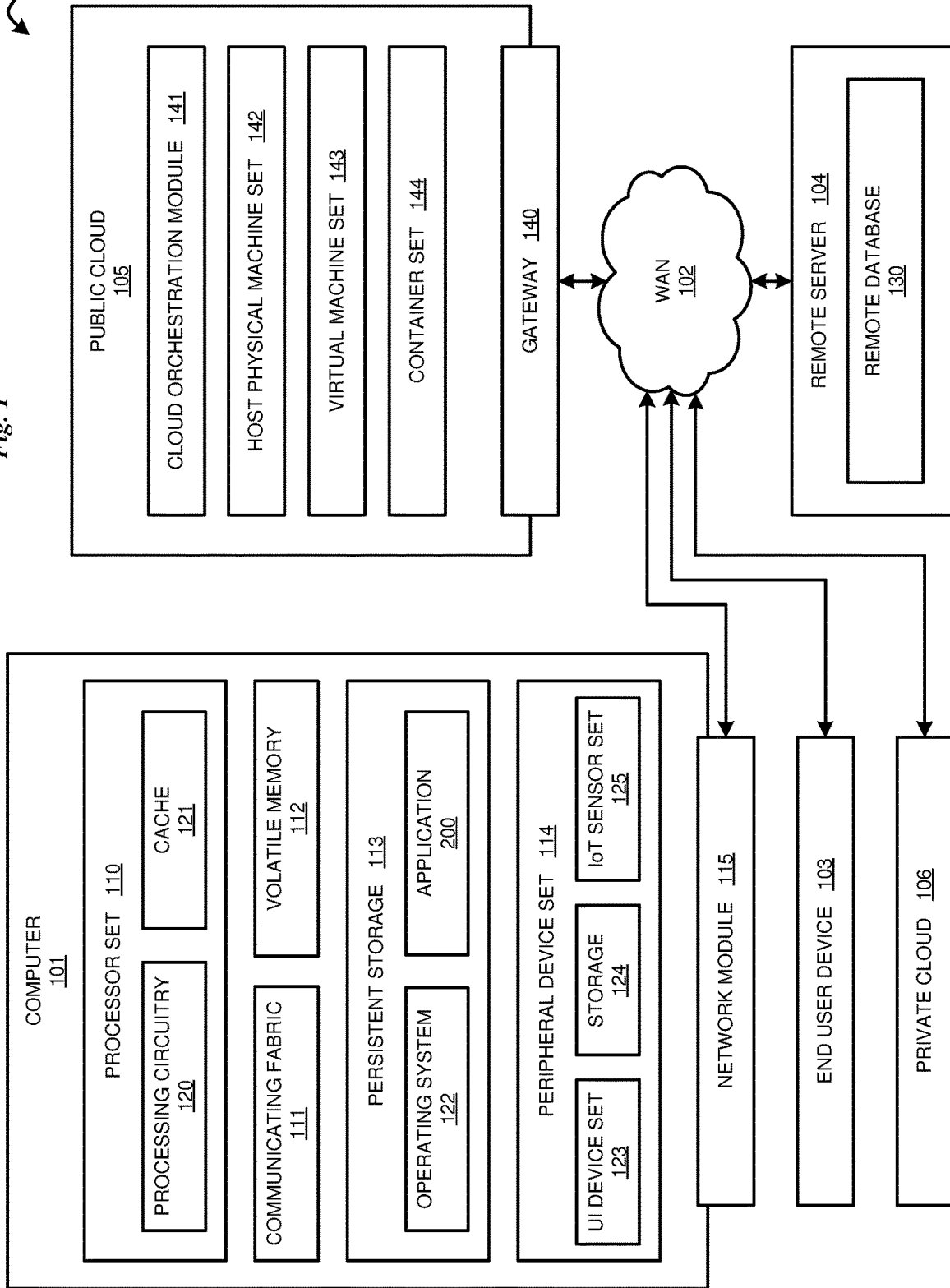
FIG. 1 depicts an example diagram of a data processing environments in which illustrative embodiments may be implemented.

The illustrative embodiments recognize that one typical search usage pattern is to copy content to the clipboard, and paste that content into an input box of a search engine (also called a search box) for use as a search. For example, a user encountering an unfamiliar phrase such as "agouti gene" in an article about genetics might copy the phrase to the clipboard. The user might paste the phrase into a search box, to obtain more information about what the agouti gene does (control hair and fur color in mammals). However, many users dislike having to explicitly perform the paste operation, particularly in environments where no keyboard shortcut is available or in environments (e.g., on a mobile device) that use a different keyboard shortcut from what a user might be used to. Thus, the illustrative embodiments recognize that there is a need to improve the user's experience by implementing predictive search without requiring the user to perform an explicit paste operation.

The illustrative embodiments also recognize that, unless the user is already signed into an account with a particular search service, past searches of the user, and other user data, will be unavailable for use in prediction. In addition, users often use multiple devices (e.g., a laptop and a mobile device), or multiple search accounts, resulting in an incomplete record of past searches. Thus, the illustrative embodiments recognize that there is a need to improve the user's predicted searches using a user's behavior on all of a user's devices and accounts, on an opt-in basis.

The illustrative embodiments recognize that the presently available tools or solutions do not address these needs or provide adequate solutions for these needs. The illustrative embodiments used to describe the invention generally address and solve the above-described problems and other problems related to clipboard based search term prediction.

An embodiment can be implemented as a software application. The application implementing an embodiment can be configured as a modification of an existing search term prediction system, as a separate application that operates in conjunction with an existing search term prediction system, a standalone application, or some combination thereof.

Particularly, some illustrative embodiments provide a method that uses a probability distribution and a search result history to compute a probability of selecting a specified number of relevant samples and a specified number of irrelevant samples from a set of contents, weights each content in the set of contents using the probability, generates a set of predicted searches using the weighted set of contents, presents the set of predicted searches for selection responsive to an indication of intent to perform a search, and causes performance of a selected search within the set of predicted searches.

Once a user opts into use of an embodiment, the embodiment receives a copy of a content a user copies to a system clipboard of a device. Techniques for receiving a content copied to a system clipboard of a device are presently available. For example, in Windows a program can register to be notified when the contents of the clipboard have changed by calling the AddClipboardFormatListener function, and can access the contents added to the clipboard by calling the GetClipboardData function. Similar mechanisms are available in other graphical user interface-based operating systems that support clipboard functionality. An embodiment timestamps a received content. To avoid operations on stale received content, an embodiment sets a timeout for a received content (e.g., one minute). Once the timeout expires, a received content is considered stale and is no longer considered received content. One embodiment discards stale content upon timeout expiration. Another embodiment discards previously received content upon receipt of new content.

An embodiment uses a set of feature extractors to extract features of a received content. Features of a received content are important portions of a content (e.g., not words such as "the" and "a") and concepts that the content is related to. For example, features of the phrase "agouti gene" might be the phrase itself, as well as "hair color inheritance" and "genetics". An embodiment represents the extracted features using a numerical representation, also called an embedding. In one embodiment, the embedding is a multi-dimensional number that can be mapped to a corresponding point in a vector space. Techniques to perform feature extraction and generate a corresponding embedding are presently available. For example, one technique used in search engines is called Term Frequency-Inverse Document Frequency, a numerical statistic that is intended to reflect how important a word is to a document in a collection or corpus. In particular, term frequency is the relative frequency of a particular term (a word or phrase) within a document, inverse document frequency is a measure of how much information the word provides and is the logarithmically scaled inverse fraction of the documents that contain the word (obtained by dividing the total number of documents by the number of documents containing the term, and then taking the logarithm of that quotient), and the Term Frequency-Inverse Document Frequency statistic is the product of the term frequency and inverse document frequency statistics. Another technique uses a presently available large language model that can create embeddings, such as doc2vector, glove, and the like.

An embodiment stores previously processed contents in a search result history. The search result history stores a content, an embedding corresponding to a content, and whether the content was considered relevant or not. A relevant content is one of the successfully predicted search outputs described herein, either because the user selected the content or the content was presented to a user as part of search result. In one embodiment, the search result history includes data of the amount of time a user spent on a content. The amount of time a user spent on a content includes total time elapsed from feature extraction of copied text until predicted search results are generated plus the time taken to traverse search history results of other devices used by the user in order to find a relevant sample. In one embodiment, if the user uses multiple devices, the search result history includes previously processed contents from one or more of the user's devices, including a device a user is not currently using to select content.

An embodiment uses a probability distribution and a search result history to compute a probability of selecting a specified number of relevant samples and a specified number of irrelevant samples from the set of contents in the search result history. One embodiment recomputes a probability for each new received content. Another embodiment recomputes a probability only for unique features identified as part of feature extraction, and does not recompute a probability for content or features already captured in the search history. Another embodiment recomputes probabilities periodically, as content expires and new content is received and processed. In one embodiment, time to live parameters (i.e., how quickly older content expires) and how often to recompute probabilities are user-configurable parameters.

In particular, an embodiment fits a negative hypergeometric distribution to the contents in the search result history. In probability theory and statistics, the negative hypergeometric distribution describes probabilities when sampling from a finite population without replacement in which each sample can be classified into two mutually exclusive categories. As random selections are made from the population, each subsequent draw decreases the population causing the probability of success to change with each draw. The population includes N elements, denoting the total number of contents in the search result history, of which K are relevant and the rest irrelevant. Elements are drawn one after the other, without replacements, until r irrelevant samples have been encountered. Then, the drawing stops and the number k of relevant samples in the total number of drawn samples is counted. The negative hypergeometric distribution is the discrete distribution of this k.

If a user uses multiple devices, contents in the search result history are grouped by the device on which a content was copied. For example, if a user uses a laptop and a mobile device, an embodiment maintains two sets of content in the search result history, one including contents a user copied while using the laptop and the other including contents a user copied while using the mobile device. For each device grouping, an embodiment uses the probability distribution to determine a probability of getting k relevant samples and r irrelevant samples. The parameter k is a predetermined constant, and in one embodiment is a user-configurable setting. In one embodiment, the parameter r is a predetermined constant. Another embodiment determines the parameter r using the expression $r = alpha*m + y$, where y denotes the minimum number of r and is a predetermined constant, alpha denotes a recall rate, and m denotes a ratio of device importance. Recall rate is the number of acceptable irrelevant samples retrieved by a search divided by the total number of irrelevant samples in the search result history. The ratio of device importance is time spent on a device a user is currently using divided by time spent on all devices of the user, over the same time period. The probability for k and r are then used as sampling odds for each of a user's devices. In particular, k and r describe the number of irrelevant samples and relevant samples within the search result history from a specific device. All of the k and r are added up across devices and then the k specific device number is divided by the sum. This determines the sampling odds for all content from a specific device as contrasted to all content from all devices. This number is then used to pick the highest relevant content from a specific device. An embodiment normalizes the probabilities in the probability distribution, so that they sum to one.

An embodiment treats a set of contents in the search result history as a set of contents being evaluated for use in generating a set of predicted searches. An embodiment applies a relevance filter to the set of contents being evaluated, by removing one or more contents that are insufficiently relevant to a most recent received content (i.e., the content that user has most recently copied to a clipboard buffer). To determine relevance, an embodiment uses a presently available technique to computes a similarity (e.g., a cosine similarity) between a numerical representation of the most recent received content and numerical representations of contents in the set of contents being evaluated, and removes a content with a numerical representation with a similarity below a threshold similarity to the numerical representation of the most recent received content.

An embodiment uses the normalized probabilities to weight each remaining content in the set of contents being evaluated for use in generating a set of predicted searches, by dividing each probability by the sum of all probabilities.

An embodiment generates, using the weighted set of contents, a set of predicted searches. One embodiment uses a predetermined number of the highest-weighted contents as predicted searches. Another embodiment uses all of the highest-weighted contents with weights above a threshold weight as predicted searches.

An embodiment receives an indication of intent to perform a search, for example a user's selection of a search input box in a search application. In response to the indication, an embodiment presents the set of predicted searches for the user to select from. One embodiment presents the set of predicted searches as a pop-up menu from which the user is able to select. In another embodiment, content already within the search result history is summarized using a presently available technique and shown in the popup menu.

Once the user selects a predicted search from the menu, an embodiment causes performance of the selected search. Techniques are presently available to cause performance of a selected search, for example by constructing a Uniform Resource Locator (URL) naming a search website and including the selected search as a URL parameter. An embodiment updates, based on a result of performance of a selected search, the search result history. An embodiment updates, based on a selection of a search within the set of predicted searches, the search result history. In particular, search content that is skipped or not viewed by a user is labeled as not relevant to the user's search. This status is stored with the document in the search history so that if the user runs the search again, the document will not be returned in the result.

The manner of clipboard based search term prediction described herein is unavailable in the presently available methods in the technological field of endeavor pertaining to computer-implemented search prediction. A method of an embodiment described herein, when implemented to execute on a device or data processing system, comprises substantial advancement of the functionality of that device or data processing system in using a probability distribution and a search result history to compute a probability of selecting a specified number of relevant samples and a specified number of irrelevant samples from a set of contents, weighting each content in the set of contents using the probability, generating a set of predicted searches using the weighted set of contents, presenting the set of predicted searches for selection responsive to an indication of intent to perform a search, and causing performance of a selected search within the set of predicted searches.

The illustrative embodiments are described with respect to certain types of contents, features, embeddings, thresholds, responses, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a clipboard based search term prediction embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. In addition, a set of contents, as described herein, can include content copied to clipboards of one or more of computer 101, end user device 103, remote server 104, or a computer in public cloud 105 or private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
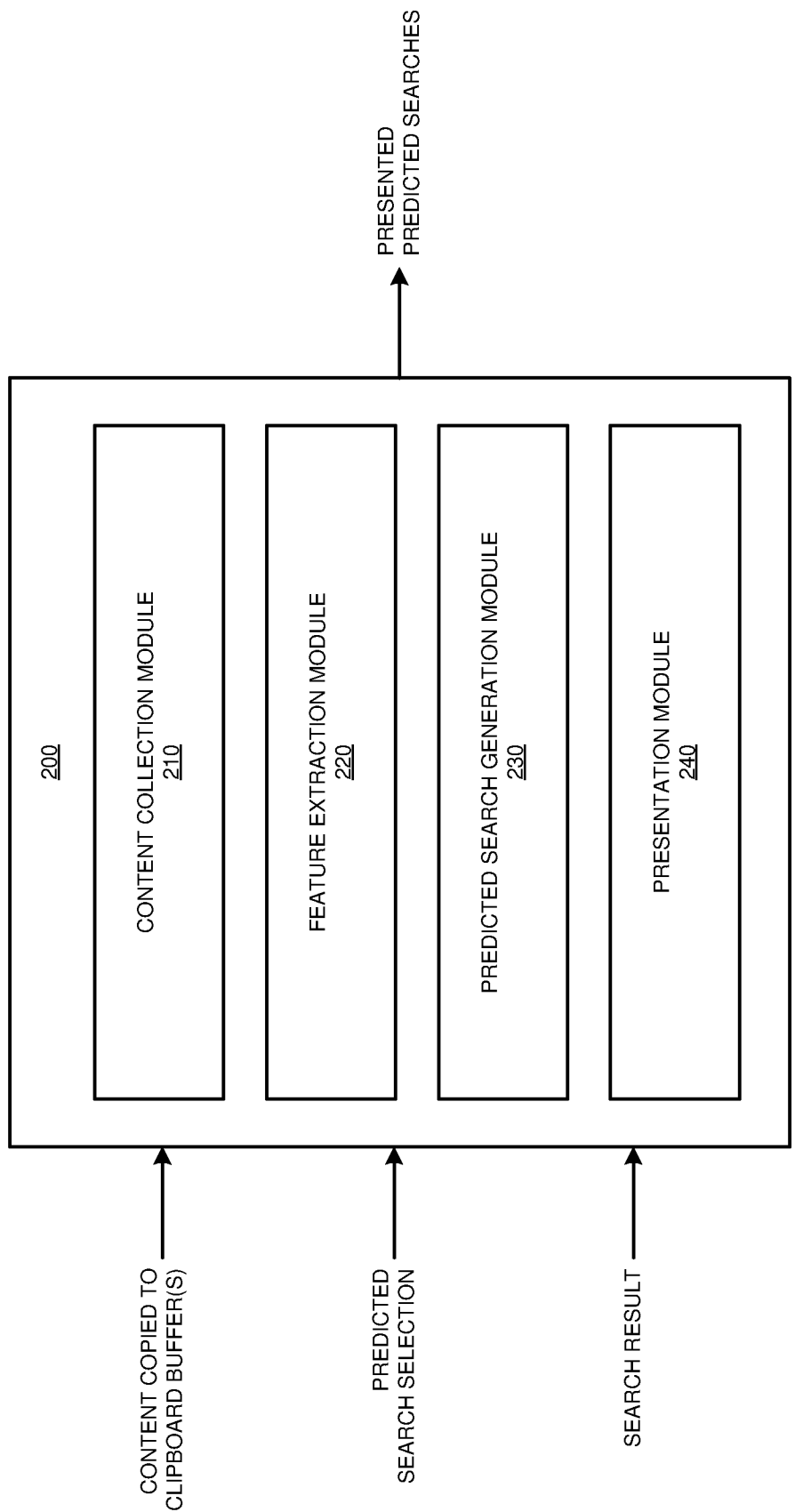
FIG. 2 depicts a block diagram of an example configuration for clipboard based search term prediction in accordance with an illustrative embodiment.

With reference to FIG. 2, this figure depicts a block diagram of an example configuration for clipboard based search term prediction in accordance with an illustrative embodiment. Application 200 is the same as application 200 in FIG. 1.

Once a user opts into use of application 200, content collection module 210 uses an operating system-specific technique to receive a copy of a content a user copies to a system clipboard of a device. Module 210 timestamps a received content. To avoid operations on stale received content, module 210 sets a timeout for a received content (e.g., one minute). Once the timeout expires, a received content is considered stale and is no longer considered received content. One implementation of module 210 discards stale content upon timeout expiration. Another implementation of module 210 discards previously received content upon receipt of new content.

Feature extraction module 220 uses a set of feature extractors to extract features of a received content. Features of a received content are important portions of a content (e.g., not words such as "the" and "a") and concepts that the content is related to. For example, features of the phrase "agouti gene" might be the phrase itself, as well as "hair color inheritance" and "genetics". Module 220 represents the extracted features using a numerical representation, also called an embedding or a feature vector. In one implementation of module 220, the embedding is a multi-dimensional number that can be mapped to a corresponding point in a vector space. One implementation of module 220 uses Term Frequency-Inverse Document Frequency statistics, and another implementation of module 220 uses a presently available large language model that can create embeddings, such as doc2vector, glove, and the like.

Application 200 stores previously processed contents in a search result history. The search result history stores a content, an embedding corresponding to a content, and whether the content was considered relevant or not. In one implementation of application 200, the search result history includes data of the amount of time a user spent focused on a content. In one implementation of application 200, if the user uses multiple devices, the search result history includes previously processed contents from one or more of the user's devices, including a device a user is not currently using to select content.

Predicted search generation module 230 uses a probability distribution and a search result history to compute a probability of selecting a specified number of relevant samples and a specified number of irrelevant samples from the set of contents in the search result history. One implementation of module 230 recomputes a probability for each new received content. Another implementation of module 230 recomputes a probability only for unique features identified as part of feature extraction, and does not recompute a probability for content or features already captured in the search history. Another implementation of module 230 recomputes probabilities periodically, as content expires and new content is received and processed. In one implementation of module 230, time to live parameters (i.e., how quickly older content expires) and how often to recompute probabilities are user-configurable parameters.

In particular, module 230 fits a negative hypergeometric distribution to the contents in the search result history. If a user uses multiple devices, contents in the search result history are grouped by the device on which a content was copied. For example, if a user uses a laptop and a mobile device, an embodiment maintains two sets of content in the search result history, one including contents a user copied while using the laptop and the other including contents a user copied while using the mobile device. For each device grouping, module 230 uses the probability distribution to determine a probability of getting k relevant samples and r irrelevant samples. The parameter k is a predetermined constant, and in one implementation of module 230 is a user-configurable setting. In one implementation of module 230, the parameter r is a predetermined constant. Another implementation of module 230 determines the parameter r using the expression r=alpha*m+y, where y denotes the minimum number of r and is a predetermined constant, alpha denotes a recall rate, and m denotes a ratio of device importance. Recall rate is the number of acceptable irrelevant samples retrieved by a search divided by the total number of irrelevant samples in the search result history. The ratio of device importance is time spent on a device a user is currently using divided by time spent on all devices of the user, over the same time period. The probability for k and r are then used as sampling odds for each of a user's devices. In particular, k and r describe the number of irrelevant samples and relevant samples within the search result history from a specific device. All of the k and r are added up across devices and then the k specific device number is divided by the sum. This determines the sampling odds for all content from a specific device as contrasted to all content from all devices. This number is then used to pick the highest relevant content from a specific device. Module 230 normalizes the probabilities in the probability distribution, so that they sum to one.

Module 230 treats a set of contents in the search result history as a set of contents being evaluated for use in generating a set of predicted searches. Module 230 applies a relevance filter to the set of contents being evaluated, by removing one or more contents that are insufficiently relevant to a most recent received content (i.e., the content that user has most recently copied to a clipboard buffer). To determine relevance, module 230 uses a presently available technique to computes a similarity (e.g., a cosine similarity) between a numerical representation of the most recent received content and numerical representations of contents in the set of contents being evaluated, and removes a content with a numerical representation with a similarity below a threshold similarity to the numerical representation of the most recent received content.

Module 230 uses the normalized probabilities to weight each remaining content in the set of contents being evaluated for use in generating a set of predicted searches, by dividing each probability by the sum of all probabilities. Module 230 generates, using the weighted set of contents, a set of predicted searches. One implementation of module 230 uses a predetermined number of the highest-weighted contents as predicted searches. Another implementation of module 230 uses all of the highest-weighted contents with weights above a threshold weight as predicted searches.

Application 200 receives an indication of intent to perform a search, for example a user's selection of a search input box in a search application. In response to the indication, presentation module 240 presents the set of predicted searches as a pop-up menu from which the user is able to select. In another implementation of module 240, content already within the search result history is summarized using a presently available technique and shown in the popup menu.

Once the user selects a predicted search from the menu, application 200 causes performance of the selected search, for example by constructing a Uniform Resource Locator (URL) naming a search website and including the selected search as a URL parameter. Application 200 updates, based on a result of performance of a selected search, the search result history. Application 200 also updates, based on a selection of a search within the set of predicted searches, the search result history. In particular, search content that is skipped or not viewed by a user is labeled as not relevant to the user's search. This status is stored with the document in the search history so that if the user runs the search again, the document will not be returned in the result.

Figure 3:
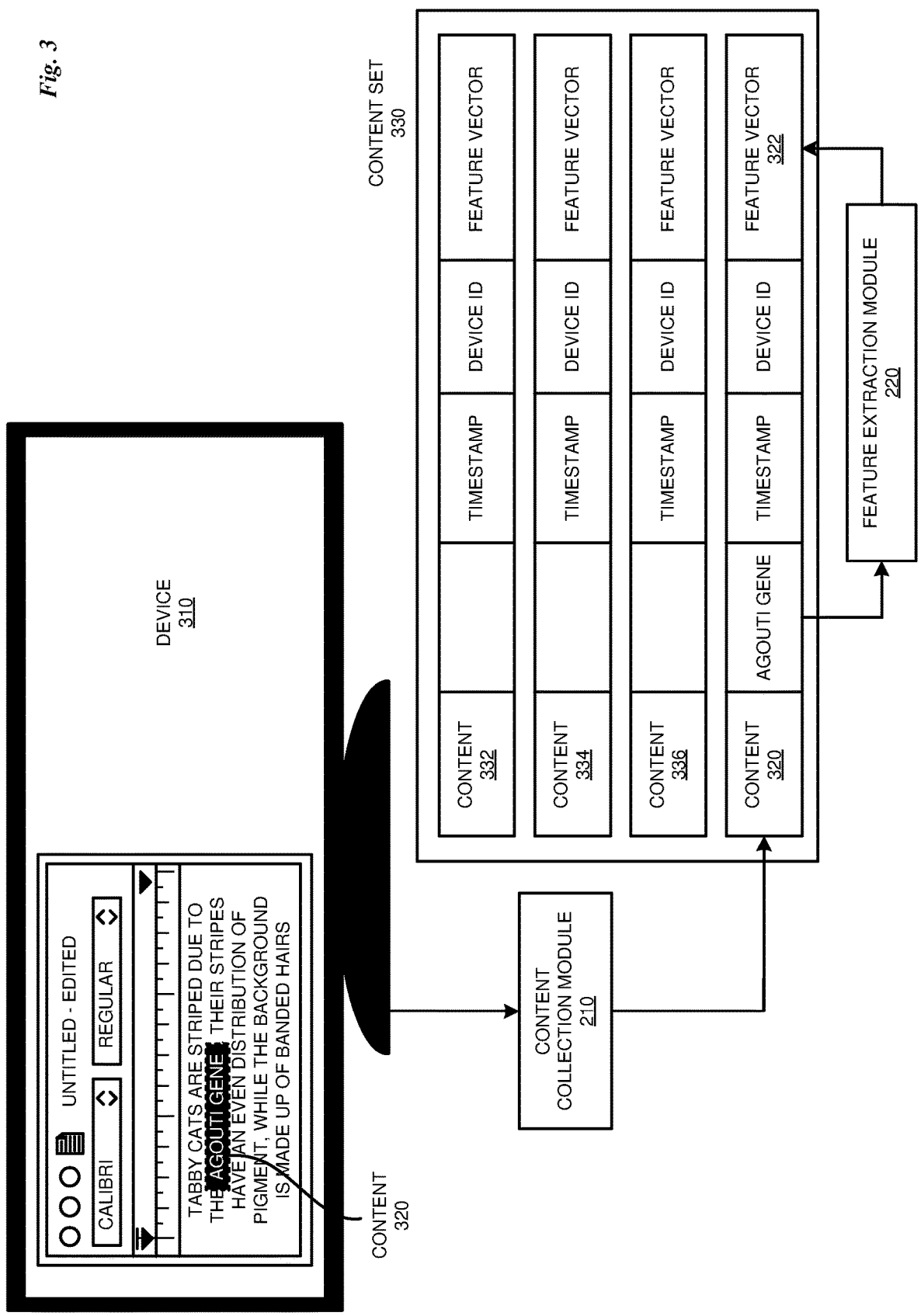
FIG. 3 depicts an example of clipboard based search term prediction in accordance with an illustrative embodiment.

With reference to FIG. 3, this figure depicts an example of clipboard based search term prediction in accordance with an illustrative embodiment. The example can be executed using application 200 in FIG. 2. Content collection module 210 and feature extraction module 220 are the same as content collection module 210 and feature extraction module 220 in FIG. 2.

As depicted, a user has opted into use of application and, using device 310, has selected content 320. Content collection module 210 uses an operating system-specific technique to receive content 320, and adds content 320 to content set 330. Content set 330 includes contents 332, 334, and 336, previously processed contents in a search result history of the user.

Feature extraction module 220 uses a set of feature extractors to extract features of content 320. Module 220 represents the extracted features as feature vector 332. Contents 332, 334, and 336 also have already-determined feature vectors.

Figure 4:
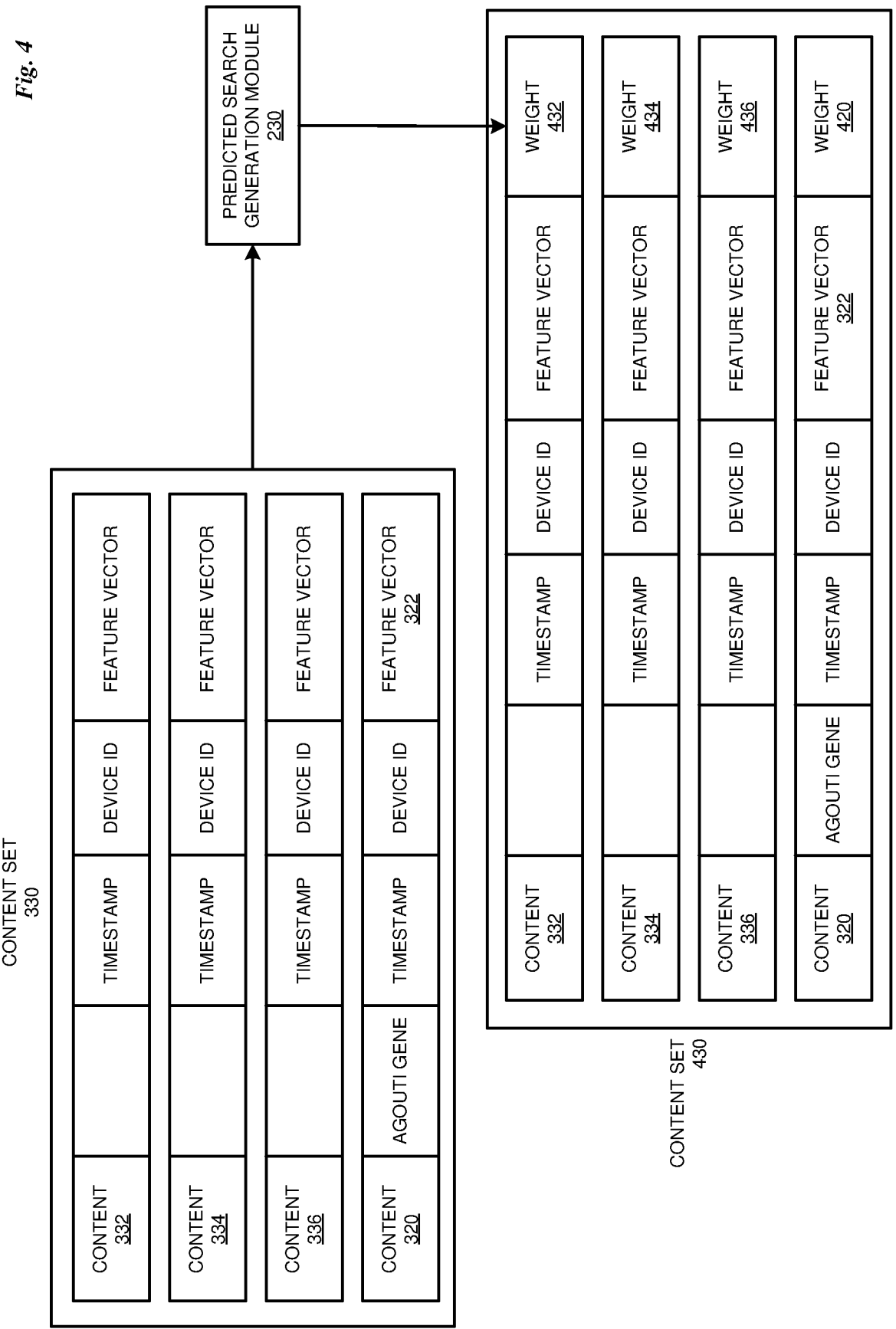
FIG. 4 depicts a continued example of clipboard based search term prediction in accordance with an illustrative embodiment.

With reference to FIG. 4, this figure depicts a continued example of clipboard based search term prediction in accordance with an illustrative embodiment. Predicted search generation module 230 is the same as predicted search generation module 230 in FIG. 2. Content set 330 and contents 320, 332, 334, and 336 are the same as content set 330 and contents 320, 332, 334, and 336 in FIG. 3.

Predicted search generation module 230 uses the normalized probabilities to weight contents 320, 332, 334, and 336 in content set 330, resulting in content set 430 with weights 420, 432, 434, and 436 respectively.

Figure 5:
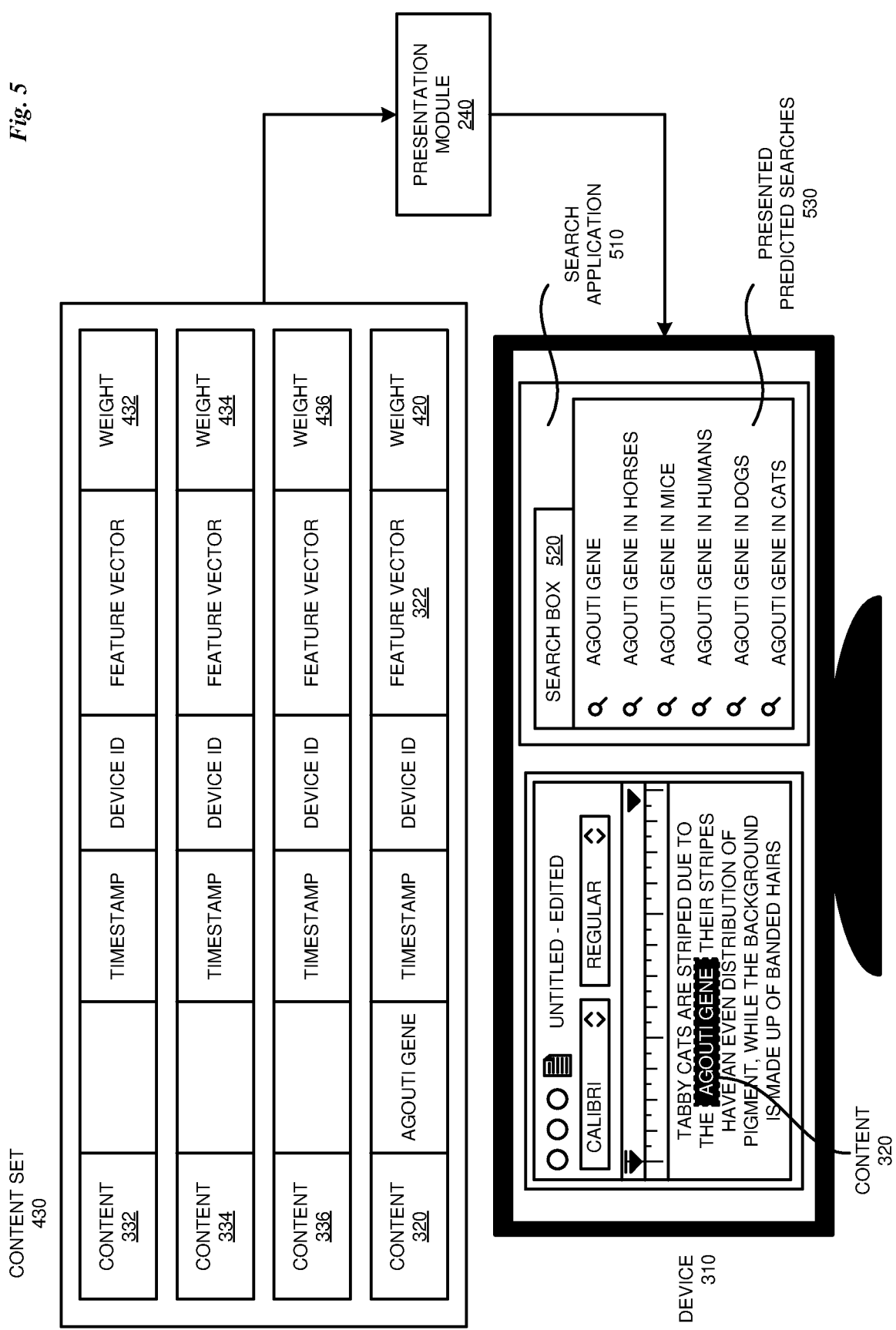
FIG. 5 depicts a continued example of clipboard based search term prediction in accordance with an illustrative embodiment.

With reference to FIG. 5, this figure depicts a continued example of clipboard based search term prediction in accordance with an illustrative embodiment. Presentation module 240 is the same as presentation module 240 in FIG. 2. Device 310 and contents 320, 332, 334, and 336 are the same as device 310 and contents 320, 332, 334, and 336 in FIG. 3. Content set 430 and weights 420, 432, 434, and 436 are the same as content set 430 and weights 420, 432, 434, and 436 in FIG. 4.

As depicted, a user has selected content 320, and application 200 has received an indication of intent to perform a search, for example a user's selection of a search box 520 in search application 510. In response to the indication, presentation module 240 presents presented predicted searches 530 as a pop-up menu from which the user is able to select.

Figure 6:
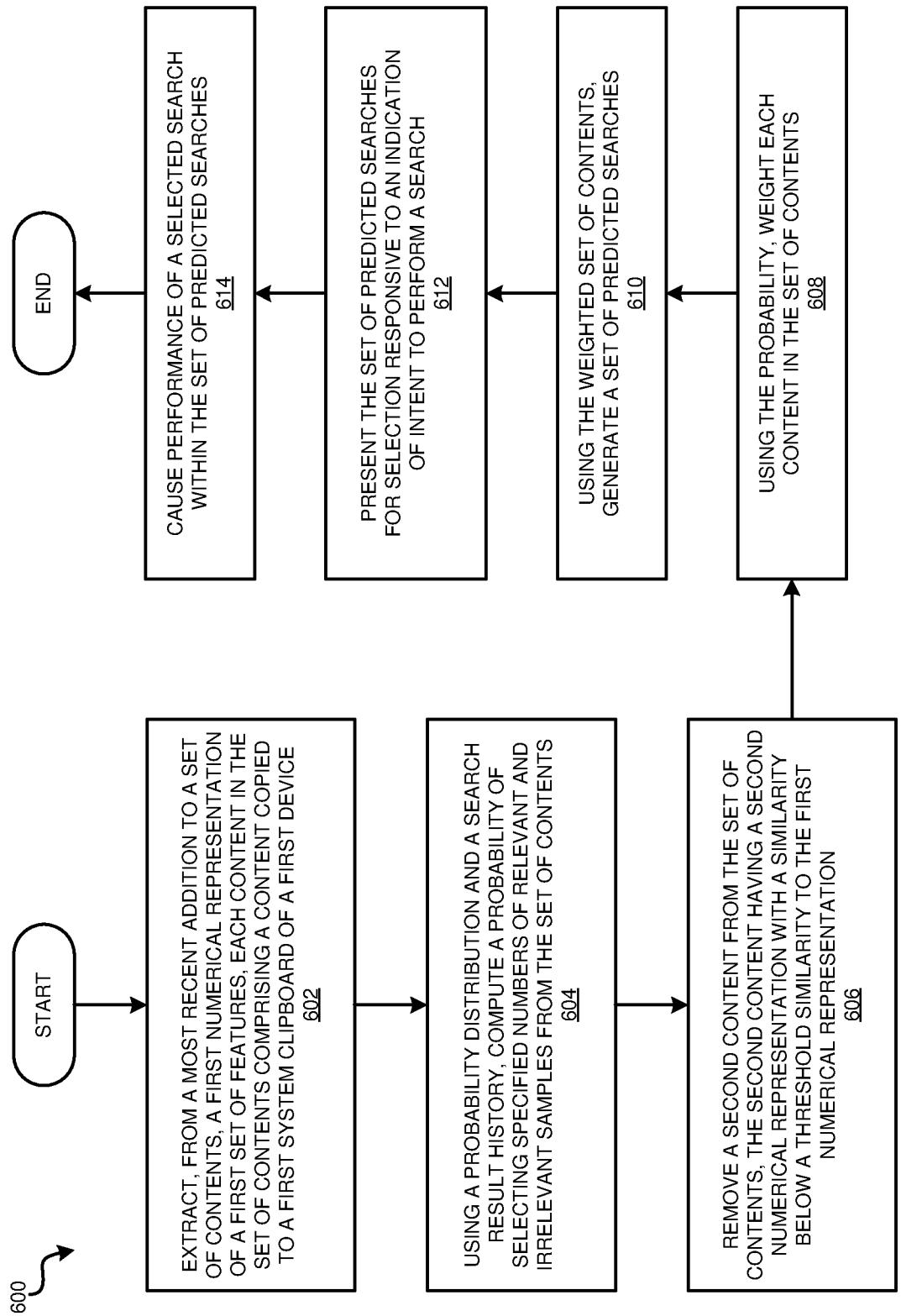
FIG. 6 depicts a flowchart of an example process for clipboard based search term prediction in accordance with an illustrative embodiment.

With reference to FIG. 6, this figure depicts a flowchart of an example process for clipboard based search term prediction in accordance with an illustrative embodiment. Process 600 can be implemented in application 200 in FIG. 2.

In block 602, the application extracts, from a most recent addition to a set of contents, a first numerical representation of a first set of features, each content in the set of contents comprising a content copied to a first system clipboard of a first device. In block 604, the application, using a probability distribution and a search result history, computes a probability of selecting specified numbers of relevant and irrelevant samples from the set of contents. In block 606, the application removes a second content from the set of contents, the second content having a second numerical representation with a similarity below a threshold similarity to the first numerical representation. In block 608, the application, using the probability, weights each content in the set of contents. In block 610, the application, using the weighted set of contents, generates a set of predicted searches. In block 612, the application presents the set of predicted searches for selection responsive to an indication of intent to perform a search. In block 614, the application causes performance of a selected search within the set of predicted searches. Then the application ends.

Thus, a computer implemented method, system or apparatus, and computer program product are provided in the illustrative embodiments for clipboard based search term prediction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

What is claimed is:

1. A computer-implemented method comprising:
implementing a predictive search functionality in a computing device using a short-term data storage and transfer feature (system clipboard) of the computing device, wherein the implementing avoids an explicit paste operation from the system clipboard, the implementing comprising—
computing, using a probability distribution and a search result history, a probability of selecting a specified number of relevant samples and a specified number of irrelevant samples from a set of contents, each content in the set of contents comprising a content stored in the system clipboard of the computing device;
weighting, using the probability distribution, each content in the set of contents, the weighting resulting in a weighted set of contents;
executing code configured for generating, responsive to an indication of an intent to perform a search, without requiring (i) the explicit paste operation and (ii) a user entry of at least a part of a search term, and by using the weighted set of contents from the system clipboard, a set of predicted search terms;
presenting, for selection responsive to an indication of intent to perform a search, the set of predicted search terms; and
executing code of the predictive search functionality wherein a code of a search function is executed using a selected search term from the set of predicted search terms to produce a search result.

2. The computer-implemented method of claim 1, further comprising:
extracting, from a first content in the set of contents, a first numerical representation of a first set of features, the first content comprising a most recent addition to the set of contents.

3. The computer-implemented method of claim 2, further comprising:
removing, from the set of contents prior to weighting the set of contents, a second content, the second content having a second numerical representation, the second numerical representation having a similarity below a threshold similarity to the first numerical representation.

4. The computer-implemented method of claim 1, wherein the set of contents comprises a third content, the third content copied to a second system clipboard of a second device.

5. The computer-implemented method of claim 4, wherein the specified number of irrelevant samples is determined according to a proportion of user time spent on a set of devices including the first device and the second device.

6. The computer-implemented method of claim 1, further comprising:
updating, based on a selection of a search within the set of predicted search terms, the search result history.

7. A computer program product comprising one or more computer readable storage medium, and program instructions collectively stored on the one or more computer readable storage medium, the program instructions executable by a processor to cause the processor to perform operations comprising:
implementing a predictive search functionality in a computing device using a short-term data storage and transfer feature (system clipboard) of the computing device, wherein the implementing avoids an explicit paste operation from the system clipboard, the implementing comprising—
computing, using a probability distribution and a search result history, a probability of selecting a specified number of relevant samples and a specified number of irrelevant samples from a set of contents, each content in the set of contents comprising a content stored in the system clipboard of the computing device;
weighting, using the probability distribution, each content in the set of contents, the weighting resulting in a weighted set of contents;
executing code configured for generating, responsive to an indication of an intent to perform a search, without requiring (i) the explicit paste operation and (ii) a user entry of at least a part of a search term, and by using the weighted set of contents from the system clipboard, a set of predicted search terms;
presenting, for selection responsive to an indication of intent to perform a search, the set of predicted search terms; and
executing code of the predictive search functionality wherein a code of a search function is executed using a selected search term from the set of predicted search terms to produce a search result.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

10. The computer program product of claim 7, further comprising:
extracting, from a first content in the set of contents, a first numerical representation of a first set of features, the first content comprising a most recent addition to the set of contents.

11. The computer program product of claim 10, further comprising:
removing, from the set of contents prior to weighting the set of contents, a second content, the second content having a second numerical representation, the second numerical representation having a similarity below a threshold similarity to the first numerical representation.

12. The computer program product of claim 7, wherein the set of contents comprises a third content, the third content copied to a second system clipboard of a second device.

13. The computer program product of claim 12, wherein the specified number of irrelevant samples is determined according to a proportion of user time spent on a set of devices including the first device and the second device.

14. The computer program product of claim 7, further comprising:
updating, based on a selection of a search within the set of predicted searches, the search result history.

15. A computer system comprising a processor and one or more computer readable storage media, and program instructions collectively stored on the one or more computer readable storage media, the program instructions executable by the processor to cause the processor to perform operations comprising:
implementing a predictive search functionality in a computing device using a short-term data storage and transfer feature (system clipboard) of the computing device, wherein the implementing avoids an explicit paste operation from the system clipboard, the implementing comprising—
computing, using a probability distribution and a search result history, a probability of selecting a specified number of relevant samples and a specified number of irrelevant samples from a set of contents, each content in the set of contents comprising a content stored in the system clipboard of the computing device;
weighting, using the probability distribution, each content in the set of contents, the weighting resulting in a weighted set of contents;
executing code configured for generating, responsive to an indication of an intent to perform a search, without requiring (i) the explicit paste operation and (ii) a user entry of at least a part of a search term, and by using the weighted set of contents from the system clipboard, a set of predicted search terms;
presenting, for selection responsive to an indication of intent to perform a search, the set of predicted search terms; and
executing code of the predictive search functionality wherein a code of a search function is executed using a selected search term from the set of predicted search terms to produce a search result.

16. The computer system of claim 15, further comprising:
extracting, from a first content in the set of contents, a first numerical representation of a first set of features, the first content comprising a most recent addition to the set of contents.

17. The computer system of claim 16, further comprising:
removing, from the set of contents prior to weighting the set of contents, a second content, the second content having a second numerical representation, the second numerical representation having a similarity below a threshold similarity to the first numerical representation.

18. The computer system of claim 15, wherein the set of contents comprises a third content, the third content copied to a second system clipboard of a second device.

19. The computer system of claim 18, wherein the specified number of irrelevant samples is determined according to a proportion of user time spent on a set of devices including the first device and the second device.

20. The computer system of claim 15, further comprising:
updating, based on a selection of a search within the set of predicted searches, the search result history.

* * * * *